United States Patent
Woodcock

(10) Patent No.: US 10,449,462 B2
(45) Date of Patent: Oct. 22, 2019

(54) AMUSEMENT PARK ATTRACTION CONTROL MANAGEMENT SYSTEM AND METHOD

(71) Applicant: Universal City Studios LLC, Universal City, CA (US)

(72) Inventor: Kathryn Lee Woodcock, Toronto (CA)

(73) Assignee: Universal City Studios LLC, Universal City, CA (US)

(*) Notice: Subject to any disclaimer, the term of this patent is extended or adjusted under 35 U.S.C. 154(b) by 78 days.

(21) Appl. No.: 15/439,720

(22) Filed: Feb. 22, 2017

(65) Prior Publication Data
US 2018/0140957 A1    May 24, 2018

Related U.S. Application Data

(60) Provisional application No. 62/424,870, filed on Nov. 21, 2016.

(51) Int. Cl.
*A63G 1/10*     (2006.01)
*G06T 11/60*    (2006.01)
(Continued)

(52) U.S. Cl.
CPC .............. *A63G 1/10* (2013.01); *A63G 7/00* (2013.01); *A63G 31/16* (2013.01); *G06T 11/00* (2013.01); *G06T 11/60* (2013.01); *G06T 13/80* (2013.01); *H04N 7/181* (2013.01); *G06F 3/1423* (2013.01); *G06F 3/1446* (2013.01)

(58) Field of Classification Search
CPC .. A63G 1/10; A63G 7/00; A63G 31/16; G06F 3/1446; G06T 11/60; G06T 13/80; G06T 11/00; H04N 7/181
See application file for complete search history.

(56) References Cited

U.S. PATENT DOCUMENTS 5,403,238 A    4/1995   Baxter et al.
5,583,844 A    12/1996  Wolf et al.
(Continued)

FOREIGN PATENT DOCUMENTS

CN    101782933    7/2010
JP    2000079281   3/2000
WO    2004059968   7/2004

OTHER PUBLICATIONS

PCT/US2017/062279 International Search Report and Written Opinion dated Feb. 13, 2018.

*Primary Examiner* — Mishawn N. Hunter
(74) *Attorney, Agent, or Firm* — Fletcher Yoder, P.C.

(57) ABSTRACT

A plurality of sensors is configured to obtain data relating to operation of a plurality of ride vehicles, wherein the plurality of sensors include cameras configured to capture images. A control system is communicatively coupled to control features of each of the plurality of ride vehicles and configured to control operation based on the data. A workstation includes at least one interface panel to provide an animated representation of the ride vehicles, wherein animation effects of the animated representation are configured to mimic movement of the ride vehicles based on positioning information. One or more panel displays of views in a matrix is positioned beyond the workstation such that an operator can observe the one or more panel displays. A portion of the views corresponds to a camera feed and a graphic indicator.

16 Claims, 5 Drawing Sheets

(51) Int. Cl.
*G06T 13/80* (2011.01)
*H04N 7/18* (2006.01)
*A63G 31/16* (2006.01)
*A63G 7/00* (2006.01)
*G06T 11/00* (2006.01)
G06F 3/14 (2006.01)

(56) References Cited

U.S. PATENT DOCUMENTS

| | | |
|---|---|---|
| 5,774,172 A | 6/1998 | Kapell et al. |
| 6,220,965 B1 | 4/2001 | Hanna et al. |
| 7,392,097 B2 | 6/2008 | Schweizer et al. |
| 2004/0092322 A1* | 5/2004 | Fea .................... A63G 7/00 472/27 |
| 2006/0293110 A1 | 12/2006 | Mendelsohn |
| 2007/0106484 A1 | 5/2007 | Sweatman et al. |
| 2013/0181901 A1 | 7/2013 | West |
| 2015/0190726 A1 | 7/2015 | Frolov |

\* cited by examiner

AMUSEMENT PARK ATTRACTION CONTROL MANAGEMENT SYSTEM AND METHOD

CROSS-REFERENCE TO RELATED APPLICATIONS

This application claims priority to and the benefit of U.S. Provisional Application No. 62/424,870 entitled "SYSTEMS AND METHODS FOR A RIDE CONTROL ROOM," filed Nov. 21, 2016, which is hereby incorporated by reference in its entirety for all purposes.

FIELD OF DISCLOSURE

The present disclosure relates generally to a system and method for controlling an attraction and, more particularly, to systems and methods for controlling an attraction from a control room.

BACKGROUND

Theme park or amusement park ride attractions have become increasingly popular. Amusement park rides often include traveling rides, which include ride vehicles that travel along a path (e.g., a railway or a track), fixed rides, which may include a motion base, or combinations thereof. The path of a traveling ride may be situated in different surroundings (e.g., on a mountain top, in a tunnel, under water). Along the path, there may be different types of show events, such as moving action figures (e.g., animatronics), video screen projections, sound effects, water effects, and so forth. Controlling and monitoring amusement park rides are generally carried out using a central controller or computer. For example, the central controller may monitor each ride vehicle's position on an associated path in real-time. The central controller may also trigger show events, such as video screen projections, based on ride vehicle positioning. Such control systems often include multiple sensors mounted at various locations along the path, and each sensor may be communicatively coupled to the central controller or computer. In some situations, the central controller or computer may be situated in a remote location, such as a control room. Further, one or more operators may monitor and control the amusement park ride from the control room. Accordingly, it is now recognized that it may be beneficial to provide for systems and methods that facilitate situational awareness to facilitate prompt control action by operators.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a plurality of ride vehicles is positioned within a course and configured to travel within the course. A plurality of sensors is configured to obtain data relating to operation of the plurality of ride vehicles as they travel within the course, wherein the plurality of sensors include cameras configured to capture images. A control system is communicatively coupled to control features of each of the plurality of ride vehicles, wherein the control system is configured to control operation of aspects of each of the plurality of ride vehicles based on the data. A workstation including at least one interface panel is configured to provide an animated representation of the ride vehicles as they travel within the course, wherein animation effects of the animated representation are configured to mimic movement of the ride vehicles based on positioning information from the data. One or more panel displays is positioned beyond the workstation such that an operator seated in an operator seating area of the workstation and facing the at least once interface panel can observe the one or more panel displays, wherein the one or more panel displays are configured to present multiple views in a matrix, wherein at least a portion of the views corresponds to a feed from a camera and wherein the control system is configured to provide a graphic indicator within a view in which an image of the ride vehicle should be present based on the data.

A system includes a central controller communicatively coupled to a plurality of ride vehicles, wherein the plurality of ride vehicles are positioned within a course and are configured to travel within the course, and wherein each of the plurality of ride vehicles comprises a vehicle controller configured to control movement of a respective one of the plurality of ride vehicles. The system includes a workstation in a control room and a panel interface of the workstation comprising one or more panels configured to display an animation of the plurality of ride vehicles as each ride vehicle of the plurality of ride vehicles travels along the course, wherein the animation is based on sensor feedback. Further, the system includes one or more panel displays with a matrix of views providing camera feeds from camera zones positioned along the course, wherein the views are ordered left to right and up to down according to a corresponding sequence of the ride vehicles traveling along the course and detection in the camera zones, wherein the one or more panel displays are positioned a distance away from the workstation and in alignment with a view of an operator sitting in an operator seating area of the workstation and facing the panel interface.

In one embodiment, a method includes identifying a location of each of a plurality of ride vehicles along a course, transmitting the location of each of the plurality of ride vehicles to a central controller located remotely from the course, generating an animation of the plurality of ride vehicles on a control panel as each ride vehicle of the plurality of ride vehicles travels along the course, wherein the animation is based in part on the identified location of each of the plurality of ride vehicles, and displaying camera feeds in progressive locations of a particular ride vehicle of the plurality of ride vehicles on a separate display when an animation of the particular ride vehicle is selected from the control panel.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
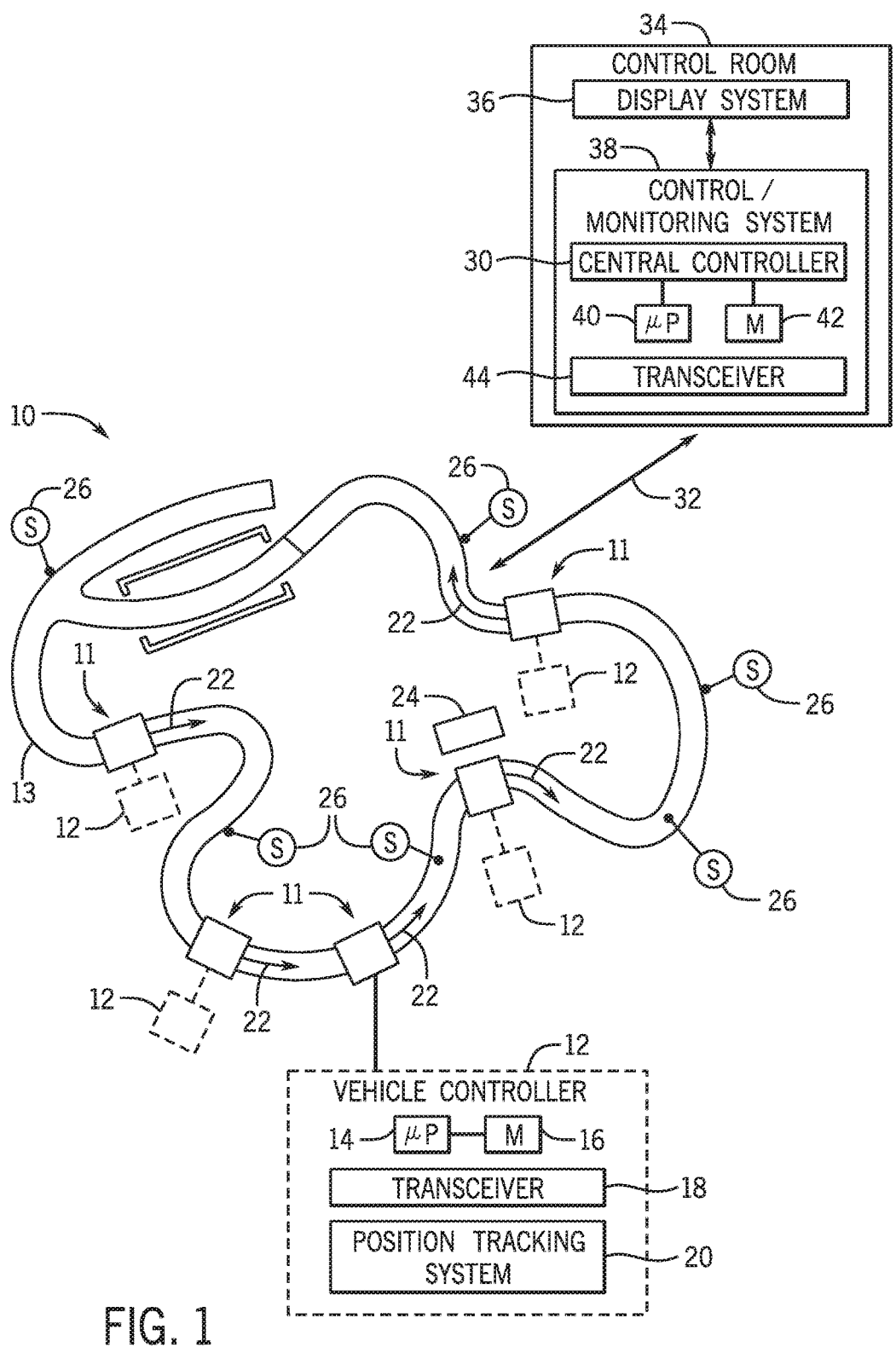
FIG. 1 is a schematic representation of an embodiment of a ride control system, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a ride control system that may be utilized by one or more operators within a control room to carry out ride surveillance and/or control operations for an amusement park ride. Specifically, the ride may include a plurality of ride vehicles positioned within a course and configured to travel within the course. The movement of each ride vehicle may include external movements, such as running and stopping of the ride vehicle in the course, and internal movements, such as rotation and tilting of a passenger platform with respect to a base of the ride vehicle. In particular, the ride control system may be configured for a continuous decision-making process that monitors whether the ride is operating as intended (e.g., under control, within desired parameters, maintaining guests within desired areas, along the projected path). For example, a human operator monitoring the ride from a remote control room may receive information from one or more sensors disposed along the course or coupled with each ride vehicle, and may utilize the received information to monitor the ride for efficacy, control, etc. In certain situations where the ride does not operate as intended, the operator may take a corrective action (e.g., issuing control signals to the vehicles, issuing instructions for the riders, adjusting the speed of the vehicles) to correct the operation of the ride and/or a particular vehicle of the ride.

In certain embodiments, an operator may utilize various display systems to monitor the ride from a remote control room, and to aid in the decision-making process. In particular, the operator may utilize information received from the one or more sensors (e.g., cameras, motion detection sensors) to assess the ride circumstances and situations. In a complex attraction, multiple control/monitoring subsystems in accordance with present embodiments may facilitate a combination of automation and human operation to maintain desirable operating conditions. Ride systems and the like inherently include potential ambiguous operating conditions that human operators are currently the best option for handling. Indeed, humans can provide the best inductive reasoning, assessment of weak indications, and flexibility in devising responses. In view of this, present embodiments are directed to guiding visual monitoring by a human operator to facilitate continuous decision making regarding control of the attraction.

In some situations, an operator may be unable to assess the images provided on the screen due to low signal-to-noise ratio, small size (in relation to the visual angle of the observer resulting from object size, camera distance, and/or screen size), low contrast resulting from darkness, environmental factors (e.g., smoke, fog), visual interferences (e.g., glare, dynamic special effects, distractions from moving equipment, multiple autonomously moving riders), and/or questionable screen images. In these and other situations, an operator may be unable to make efficient decisions regarding the management of passengers and the operations of the ride vehicles. Indeed, the operator monitoring the attraction may only have a short period of time to evaluate the current conditions and determine a future decision. However, within the short period of time that the operator has to assess the conditions further, the images and other feedback provided to the operator may no longer be accessible, at least because the ride and riders have continued to move.

In order to address these and other situations, the present disclosure is related to systems (e.g., display systems, work interfaces, workspaces) that promote a strong situational awareness for the operator within a control room or area. By facilitating informed visual monitoring, present embodiments facilitate execution of appropriate control actions by operators as the ultimate decision-making task of control. In particular, situational awareness as facilitated by present embodiments may enable the operator to fluently interpret observed conditions associated with an attraction, and may enable the operator to select appropriate control actions. For example, features of the present disclosure may enable an operator to quickly assess status and engage with the interface to manipulate the process in what is perceived by the operators as a direct manner. Further, features of the present disclosure may enable the operator to intuitively engage with the process, without having to spend substantial time learning, recalling, and manipulating knowledge about how the interface maps onto the process. Indeed, present embodiments provide intuitive features that provide confidence and accuracy with respect to control actions that will create effects to address identified issues. In particular, certain embodiments of the present disclosure relate to an organization and configuration of the control room and control interface (e.g., hardware and furniture) that allows a single and/or a plurality of operators to intuitively monitor and control the attraction. In the described embodiments, the "control room" may be an observation area (e.g., room) remote or separated from one or more attractions (e.g., ride and ride vehicles), which may be used by one or more operators, for example, when direct observation of the attractions is not feasible or practical.

With the forgoing in mind, FIG. 1 illustrates a schematic representation of an embodiment of a ride control system 10 in accordance with the present disclosure. The ride control system 10 includes a plurality of ride vehicles (e.g., a vehicle 11) positioned within a course 13 and configured to travel within the course 13. The course 13 may include an open space, a playground, or a path (e.g., a railway, channel of water or a track). In certain embodiments, the vehicle 11 (e.g., cart, boat, or sled) may include a base, a passenger platform (e.g., a passenger seating area) on top of the base, one or more actuators, a brake, a motor, a steering device (e.g., steering wheel), and/or one or more wheels. Each vehicle 11 may be associated with a vehicle controller 12 that is configured to control one or more aspects of the vehicle 11, such as control features (e.g., motors, actuators, lifts, brakes). For example, the vehicle controller 12 may include a processor 14 associated with a memory 16, a transceiver 18, and/or a position tracking system 20. Further, in some embodiments, the vehicles may include features that facilitate autonomous control.

In certain embodiments, the vehicle controller 12 may regulate the movement of the vehicle 11 in a general direction along the course 13, as illustrated by an arrow 22. For example, the vehicle controller 12 may regulate the motor, the brake, and/or the wheels of the vehicle 11 to provide external movements of the vehicle 11 along the course 13. The external movements of the vehicle 11 may include running (e.g., acceleration, deceleration), stopping, and steering of the vehicle 11. The motor may be powered by any suitable power source, including, but not limited to, a battery, a solar panel, an electrical generator, a gas engine, or any combination thereof. The brake may be mounted to one or more wheels of the vehicle 11. The operations of the motor and the brake may be controlled by the vehicle controller 12. For example, the vehicle controller 12 may control the motor to adjust its output power to accelerate or decelerate the vehicle 11. The vehicle controller 12 may also control the brake to apply certain amount of force on the wheels to decelerate or stop the vehicle 11. In some embodiments, the steering device may also be controlled by the vehicle controller 12. It should be noted that these functions of the vehicle controller 12 and others described herein may instead be managed solely by a central controller or jointly managed with the central controller.

One or more show events 24, as discussed in greater detail below, may be disposed within the course 13. When the vehicle 11 moves in the direction 22 and approaches a show event 24, the show event 24 may be triggered, and the passenger within the vehicle 11 may view, listen to, and/or interact with the show event 24. For added realism and effect, the show event 24 may be synchronized with the movement of the passenger platform of the vehicle 11 and/or with the movement of the vehicle 11.

In certain embodiments, the vehicle 11 includes a position tracking system 20 for monitoring its position within the course 13. As discussed in greater detail below, a plurality of sensors 26 may be disposed along the course 13. Each sensor 26 represents a unique location (e.g., coordinates relative to one or more reference points) within the course 13, or may gather other types of sensor feedback associated with the current conditions of the vehicles 11. For example, the sensors 26 may include cameras, motion detectors, accelerometers, or other forms of data gathering devices. In certain embodiments, the sensors 26 may be position indicators that communicate with the position tracking system 20. The vehicle position tracking system 20 includes a reader. As the vehicle 11 travels in the course and is near a position indicator, the reader may sense the position indicator to provide the position information of the vehicle 11. The reader then supplies the position information to the vehicle controller 20.

The vehicle controller 20 may include various components that may allow for operator interaction with the vehicle 11. The vehicle controller 12 may include an automation controller or set of automation controllers, such as a distributed control system (DCS), a programmable logic controller (PLC), or any computer-based device that is fully or partially automated. For example, the vehicle controller 12 may be any device employing a general purpose or an application-specific processor 14. The vehicle controller 12 may also include the memory 16 for storing instructions executable by the processor 14 to perform the methods and control actions described herein for the vehicle 11. The processor 14 may include one or more processing devices, and the memory 16 (e.g., a hard drive) may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 14 or by any general purpose or special purpose computer or other machine with a processor. While certain example embodiments are described herein as being operable to perform functions with the vehicle controller 11 (e.g., the processor 14), it should be noted that such functions may be performed by a central controller 30 and/or cooperatively performed (e.g., redundantly or in coordination) by the central controller 30 and the vehicle controller 12.

In certain embodiments, the vehicle controller 12 may include a vehicle transceiver 18 that communicates wirelessly with the central controller 30. In particular, each vehicle 11 may include a vehicle transceiver 18 that is communicatively coupled to the central controller 30. In certain embodiments, a wireless network 32 may be established between each vehicle controller 12 and the central controller 30. Data and/or sensor feedback may be transferred between the central controller 30 and each vehicle controller 12 via the wireless network 32. The vehicle controller 12 may transfer data indicative of the status of the vehicle 11 to the central controller 30. Such data and/or sensor feedback may include the vehicle identifier, position, velocity, dynamic blocking zone, traveling direction, motor output power, loading condition, continuous real-time images or feeds, pictures, or the like.

In certain embodiments, the central controller 30 may be disposed within a control area or room 34 that is disposed within a location or area remote/separated from the attraction in some manner. For example, the control area 34 may not have direct visual access to at least certain portions of the ride system. Indeed, this is frequently the case for attractions because it is often impossible to have direct visual access to all areas of an attraction (e.g., all areas along the length of a ride path or course). In certain embodiments, the control room 34 may include a display system 36 that interfaces with a control/monitoring system 38. The control/monitoring system 38 may include the central controller 30, a processor 40, a memory 42, and/or a transceiver 44. Based on the received data and/or sensor feedback, the central controller 30 may be configured to interface with the display system 36 to provide an operator with a work interface that promotes a strong situational awareness of the attraction, as further described with respect to FIGS. 2-4. Further, the operator may utilize the display system 36 and the control/monitoring system 38 to assess current and future situations for a continuous and seamless decision-making process. That is, the operator may be provided information in a manner that facilitates ready interpretation of available data and efficient decision-making. It should be noted that the control system 38 can broadly be considered to include the display system 36. Further, it should be noted that references to control and operational aspects of the display system 36 in the present disclosure may be interpreted to include functionality provided by features of the control system 38. For example, discussion of a panel or other feature of the display system 36 operating or being configured to perform an operation should be understood to include embodiments wherein control is performed by features (e.g., the processor 40) of the control system 38.

The central controller 30 includes various components that may allow for operator interaction with the wireless network 32 and the vehicle 11. The central controller 30 may include a distributed control system (DCS), a programmable logic controller (PLC), or any computer-based automation controller or set of automation controllers that is fully or partially automated. For example, the central controller 30 may be any device employing a general purpose or an application-specific processor. The central controller 30 may also include the memory 42 for storing instructions executable by the processor 40 to perform the methods and control actions of the system including the wireless network 32 and the vehicle 11. The processor 40 may include one or more processing devices, and the memory 42 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 40 or by any general purpose or special purpose computer or other machine with a processor.

In certain embodiments, the operator may utilize the control system 38 to send instructions (e.g., control signals) to the vehicle controller 12 (via the control room transceiver 44) to control the movement of the vehicle 11. In certain embodiments, the central controller 30 is also connected to, and controls the operations of, one or more show events 24 along the course 13. The show event 24 may include video elements (e.g., projection of images or a motion picture), sound effects, moving elements (e.g., flying of an action figure, eruption of a volcano), animatronics (e.g., a walking dinosaur), mists, fog, scent, pyrotechnics or any combination thereof. It is contemplated that any suitable show events that may be controlled by a controller may be included in the course.

Figure 2:
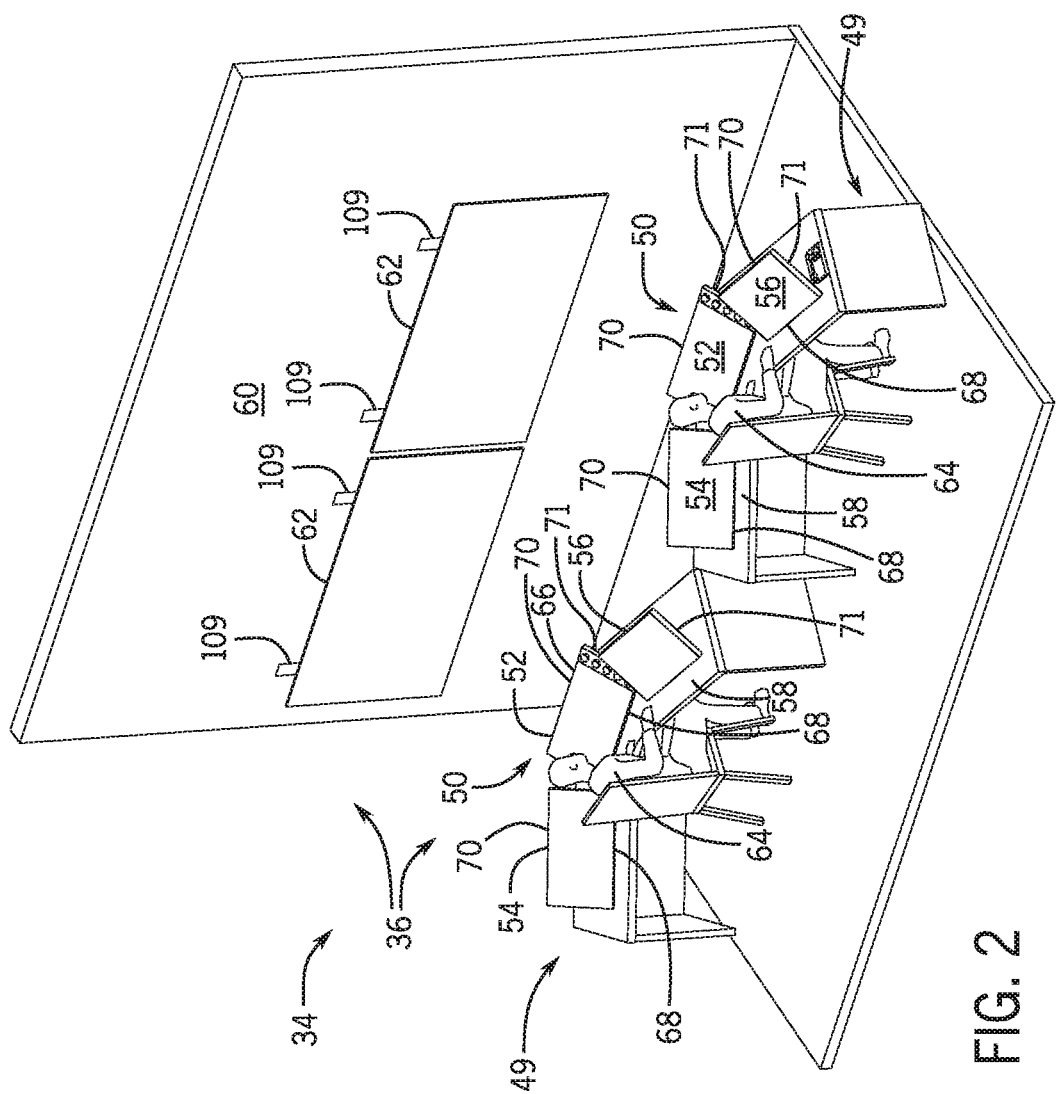
FIG. 2 is a perspective view of a control room of the ride control system of FIG. 1, where the control room includes a display system, in accordance with an embodiment of the present disclosure.

FIG. 2 is a schematic representation of an embodiment of the control room 34 of the ride control system of FIG. 1, where the control room 34 includes the display system 36, which may be considered an aspect of the control/monitoring system 38. In the illustrated embodiment, the display system 36 includes two workstations 49, each including a tri-panel interface 50 with interface panels (e.g., a overview panel 52, a solo screen 54, and an informational/menu panel 56), and a worksurface 58. The control room 34 also includes an array wall 60 having one or more panel displays 62. In certain embodiments, the control room 34 may be organized and arranged for a single operator 64. In other embodiments, such as in the illustrated embodiment, one or more operators 64 may work within the control room 34 including multiple tri-panel interfaces 50 (e.g., one for each operator). In some embodiments, multi-panel interfaces (including tri-panel interfaces) may be used. It should be noted that in certain embodiments, each operator 64 may have a personal display system 36 that may be customized for the operator's personal preferences (e.g., height, eye sensitivity). Further, each operator 64 may utilize and customize furniture within the control room 34, such as, but not limited to, a functional seating area and a desk that includes the worksurface 58.

Figure 3:
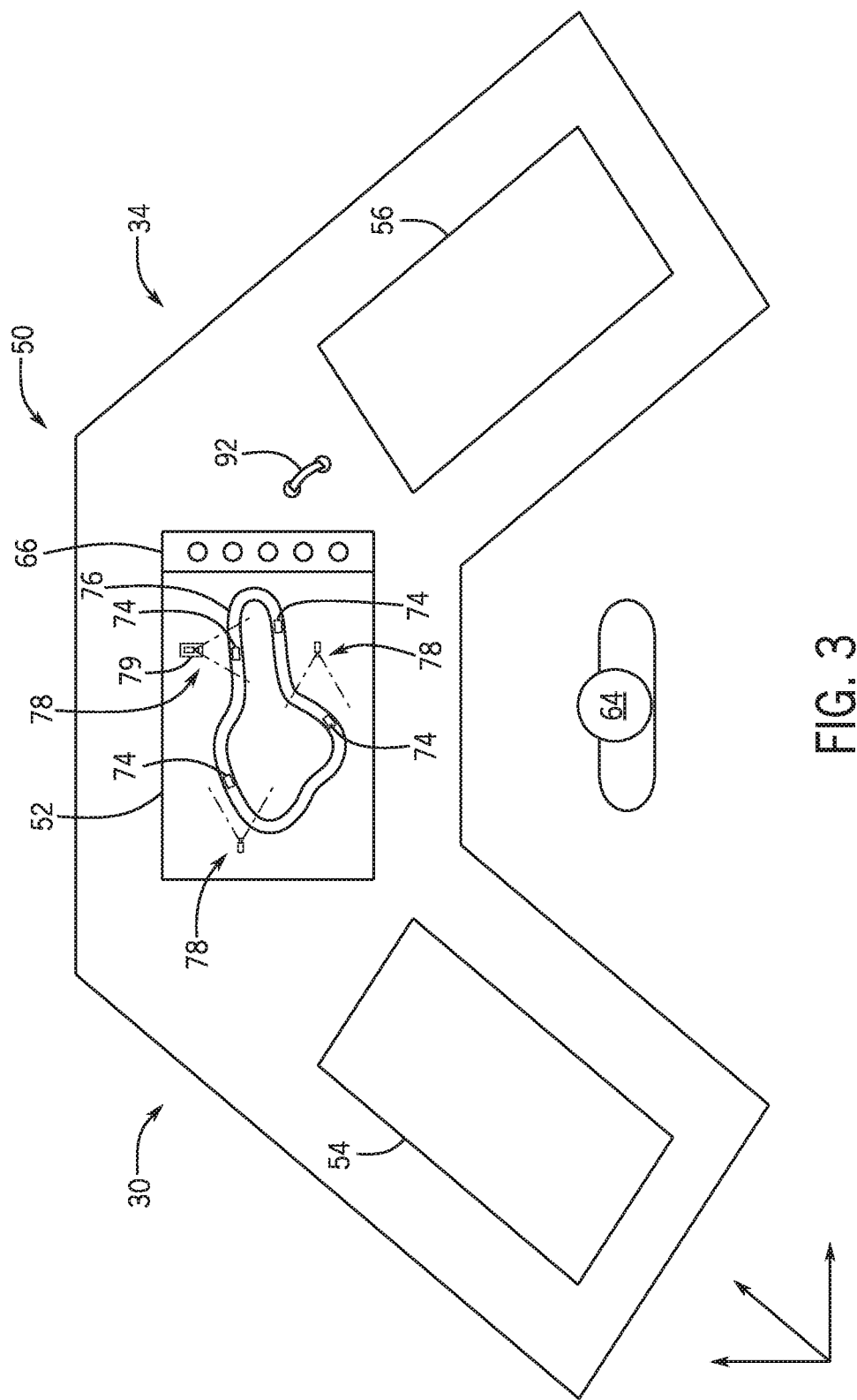
FIG. 3 is a representation of a panel interface of the display system of FIG. 2, in accordance with an embodiment of the present disclosure.

FIG. 3 is a schematic representation of an embodiment of the tri-panel interface 50 of the display system 36 of FIG. 2, in accordance with an embodiment of the present disclosure. The tri-panel interface 50 includes the overview panel 52, the solo screen 54, and an informational/menu panel 56. While the illustrated embodiment of FIG. 2 has the panels (panels 52, 54, 56) in a particular arrangement, which is believed to provide efficiency in operation, other embodiments may include different arrangements. Further, the display system 36 may be configurable such that display functions can be manipulated and/or switched via software activation and/or via mechanical repositioning. It should also be noted that viewing angles and general positioning of the panels may be mechanically adjustable. Present embodiments may include adjustment features that connect the panels to the worksurface 58 and allow for adjustment within a range of movement. Also, as illustrated in FIG. 3, the display system 36 may include a mechanical actuation panel such as the control column 66, which may be integrated with the worksurface 58 or a panel. In the illustrated embodiment, the control column 66 includes various physical input mechanisms (e.g., hardware buttons, switches, slides) and is integrated with the overview panel 52. Specifically, for example, the control column 66 may include emergency stop actuation mechanisms (e.g., buttons) organized beside the overview panel 52 and between the overview panel 52 and the informational/menu panel 56 to facilitate operator access (visually and physically).

In the illustrated embodiment, the overview panel 52 (e.g., having a screen size of approximately 32 inches based on conventional diagonal measurement) is disposed between the other two panels and directly in front of the seating for the operator 64. The overview panel 52, like the other two panels 54, 56, may include a touchscreen display or some other control panel that allows user interaction; however, other control action input devices may also be used (e.g., trackballs, keyboards, microphone, mice). In certain embodiments, the location and the orientation of the overview panel 52 may be configured to accommodate operator 64 preferences. For example, the overview panel 52 may include an adjustable display (e.g., at least an adjustable display pitch) that may be moved into a preferred position for the operator 64 (e.g., within fingertip reach without leaning away from a backrest of the seat). In one embodiment, the overview panel 52 is pitched backward such that a bottom edge 68 is adjacent the worksurface 58, an upper edge 70 is positioned away from the operator seating area and above the worksurface 58, and an acute angle is established between the worksurface 58 and a rear edge 71 of the overview panel 52. Further, the overview panel 52 may include detailed information in a lower portion of the graphical display area of the overview panel 52, which avoids interfering with or distracting from the view of the array wall 60 having one or more panel displays 62. By positioning the overview panel 52 in this manner and including the detailed information in at least the lower half of the panel's graphical display area, present embodiments prioritize and increase focus on the array wall 60 except when interaction with the overview panel 52 is desirable. It should be noted that the references numerals for edges 68, 70 and 71 are used to indicate the edges of each of the panels 52, 54, and 56 (as shown in FIG. 2).

With respect to the graphical interface of the overview panel 52, it has been previously noted that an animated representation of the overall attraction or ride is provided in accordance with present embodiments. The overview panel 52 may be defined by its presentation of such material. The overview panel 52 may also be referred to as a mimic panel because it may provide graphical displays with active features (e.g., animations) that mimic actual activities within the attraction. For example, animations 74 may be programmed to reflect, in schematic form, positioning, status, and progression of the ride vehicles 11 along the course 13, which is represented by graphical feature 76.

Present embodiments may facilitate intuitive control and monitoring by providing clear and strongly correlative interfaces with the actual process to avoid delay in mentally mapping control system features to actual aspects of the attraction or ride system. Indeed, present embodiments may create graphics that are selectable via the touch screen such that an operator feels that she is directly manipulating the process. For example, camera zones (e.g., areas viewable by actual cameras located throughout the attraction) may be indicated on the schematic on the overview panel 52 with active graphical elements 78 (e.g., camera icons and delineations of viewable areas). The operator 64 may interact with the overview panel 52 and may engage a specific camera zone by selection of a corresponding active graphical elements 78, which may cause the corresponding camera (or set of cameras) to have its feed displayed on the solo screen 54 (and/or on a prominent portion of the array wall 60). The camera zone currently selected and, for example, appearing on the solo screen 54 may be visibly distinctive on the overview panel 52. For example, the graphical element 78 associated with the selected camera zone may be highlighted with graphics, as generally indicated by highlighting 79. As another example, touching ride vehicle animations 74 may send a progression of camera feeds to the solo screen 54 as the actual ride vehicles are identified as being present in the various (e.g., consecutive or successive) corresponding camera zones. This may be referred to as a "follow the ride vehicle" functionality and may be done in essentially real time to facilitate efficient performance of the operator 64 using this functionality. In this manner, the display system 36 may display images of the actual ride vehicles 11 as they progress along the course 13. In another embodiment, selecting a ride vehicle animation 74 may initiate a feed from a camera coupled to the ride vehicle 11 and recording passengers or operational aspects of the actual vehicle 11 associated with the animation 74.

The active (selected) ride vehicle animation 74 may be visibly distinctive, such as with various animations, while it is selected for monitoring or other actions (e.g., graphics representing sound may be shown when a speaker for the vehicle is activated by a microphone). In one embodiment, selecting a ride vehicle animation 74 will provide a camera feed of vehicle occupants from a camera disposed on the actual ride vehicle 11 corresponding to the selected vehicle animation 74. In yet another embodiment, selection of a ride vehicle animation 74 may initiate control (e.g., positional control) of the corresponding ride vehicle 11, or may facilitate communication with passengers within that particular ride vehicle 11 among other things. In some embodiments, selection of the ride vehicle animation 74 may provide for a selection of available actions (e.g., via a pulldown menu). However, other embodiments may initiate immediate action to facilitate immediate response.

It should be noted that automated selection (or other initiation of display) of any aspect of the system (e.g., a camera zone) may be provided when conditions are detected that merit analysis by an operator (e.g., certain sensors indicate that closer inspection of the area is required because a guest may have exited a ride vehicle at an improper location). In certain embodiments, the sensors 26 may include pressure sensors, optical beam sensors, motion detectors, wireless field sensors, and so forth in the three-dimensional space along the course 13. In certain embodiments, the sensors 26 may be configured to provide image analysis of the surveillance camera data (e.g., unexpected data in the image), and may communicate resulting information to the central controller 30. Indeed, the sensors 26 may detect indications of the ride vehicles' excursion outside of a containment envelope (e.g., the course 13), positioning of items or components outside of a designated area, and/or pedestrian entry into zones outside the ride vehicle 11. The information from the sensors 26 may be utilized to animate the one or more vehicles on the display system 36 in a way that intuitively draws attention to the cause. In certain embodiments, to prompt operator review of indications from automated sensors 26, the ride overview panel 52 may highlight the location(s) of interest for the operator 64, such that it is easily visible on the display system 36. For example, when automatically sensed conditions are communicated to the central controller and warrant immediate automated control commands (e.g., safe ride stop), the automation status may be represented on the overview panel 52 and/or the information/menu panel 56, indicating the location of the initiating sensor 26 along the course 13.

As referenced above, the solo screen 54, which may also be referred to as a detail view panel 54 or a solo panel 54, may be included within the display system 36 and may work in conjunction with the other components of the display system 36. As with the overview panel 52, the solo panel 54 may be physically adjustable to accommodate viewing preferences of the operator 64. In one embodiment, the solo screen 54 is pitched backward such that the bottom edge 68 is adjacent the worksurface 58, the upper edge 70 is positioned away from the operator seating area and above the worksurface 58, and an acute angle is established between the worksurface 58 and the rear edge 71 of the solo panel 54. The solo panel 54 and the overview panel 52 may join (on the left or right of the overview panel 52) to form a corner in some embodiments. In one embodiment, the solo panel 54 includes a 32 inch touch screen and is positioned within seated fingertip reach of the operator 64 without requiring the operator 64 to lean away from a backrest. The solo panel 54 may coordinate with a microphone 92 such that when a certain zone is being displayed on the solo view, any communications initiated via the microphone will correspond to activation of a speaker associated with the displayed zone. For example, if a camera feed for a particular ride zone is actively being displayed on the solo panel 54, activation of the microphone 92 will default to providing corresponding audio via a speaker that is associated with the particular ride zone. In this way, intuitive communication (e.g., audible and/or visual) with guests or workers (e.g., maintenance team members) is provided. However, other speaker options may be provided and the default arrangement may be bypassed.

With respect to the graphical interface, the solo screen 54 may be utilized to digitally superimpose information associated with a ride vehicle, a sensor, a camera, a camera number, a scene name, a show event, and/or architectural references as a label on the solo screen 54. The solo screen 54 may be defined by its presentation of such material. For example, information associated with a selected feature of the attraction (e.g., a selected camera zone) may be provided via the solo screen 54. Specifically, for example, digitally imposed textual data may be provided in conjunction with animation of the one or more ride vehicles as they move along the course 13 on the display system 36. This may serve the dual function of informing the operator 64 and facilitating actual directions to a particular area of the attraction that needs attention (e.g., maintenance, operations). Indeed, the terminology utilized on the solo screen 54 may correspond to directions required by operations, or technical personnel who may need to be directed to the specific location or feature (e.g., a specific control panel). Further, the position of digital labels on the solo screen 54 may be arranged to avoid obscuring important details. For example, the solo screen 54 may include caption positions that further illustrate the information pattern of different camera views.

As noted above, in the illustrated embodiment, the display system 36 also includes an information/menu panel 56, which may be referred to as the menu panel 56 and which may be positioned on a side of the overview panel 52 opposite the solo panel 54. As with the overview panel 52 and the solo panel 54, the menu panel 56 may be physically adjustable to accommodate viewing preferences of the operator 64. In one embodiment, the menu panel 56 is pitched backward such that the bottom edge 68 is adjacent the worksurface 58, the upper edge 70 is positioned away from the operator seating area and above the worksurface 58, and an acute angle is established between the worksurface 58 and the rear edge 71 of the menu panel 56. The menu panel 56 and the overview panel 52 may join (on the left or right of the overview panel 52) to form a corner in some embodiments.

With respect to the graphical interface, the menu panel 56 (e.g., a 32 inch display) may provide and display reference material, selectors for selectable settings, inputs for control actions, or other preference settings that may be customized for the operator 64. The menu panel 56 may be defined by its presentation of such material. For example, the menu panel 56 may provide tiles (selectable icons or graphics) that open alternate views/windows (graphical displays) via touchscreen input, speaker control selectors that activate speakers throughout the attraction, call up procedure pages (graphical displays), equipment specification pages, team member advisory memos, and so forth. The menu panel 56 may have a default for displaying active graphical features (e.g., soft buttons and sliders) for selectable settings of control actions not performed (or not part of a default) for the overview panel 52. Soft controls of the menu panel 56 may also reflect the hard controls of the control column 66 to provide redundancy and robustness to the control system 38. In certain embodiments, the information/menu panel 56 may include a username/password access for each operator 64, and may load the operator's saved settings for the display system 36. Further, in coordination with other aspects of the display system 36, when either automated sensing indicates a condition requiring operator clarification or when the operator 64 selects a particular location/condition, the menu panel 56 is configured to indicate the nature of relevant sensors (or a single relevant sensor) along with a location, which may include natural language describing the general location and/or specific location of the sensor or relevant area.

Figure 4:
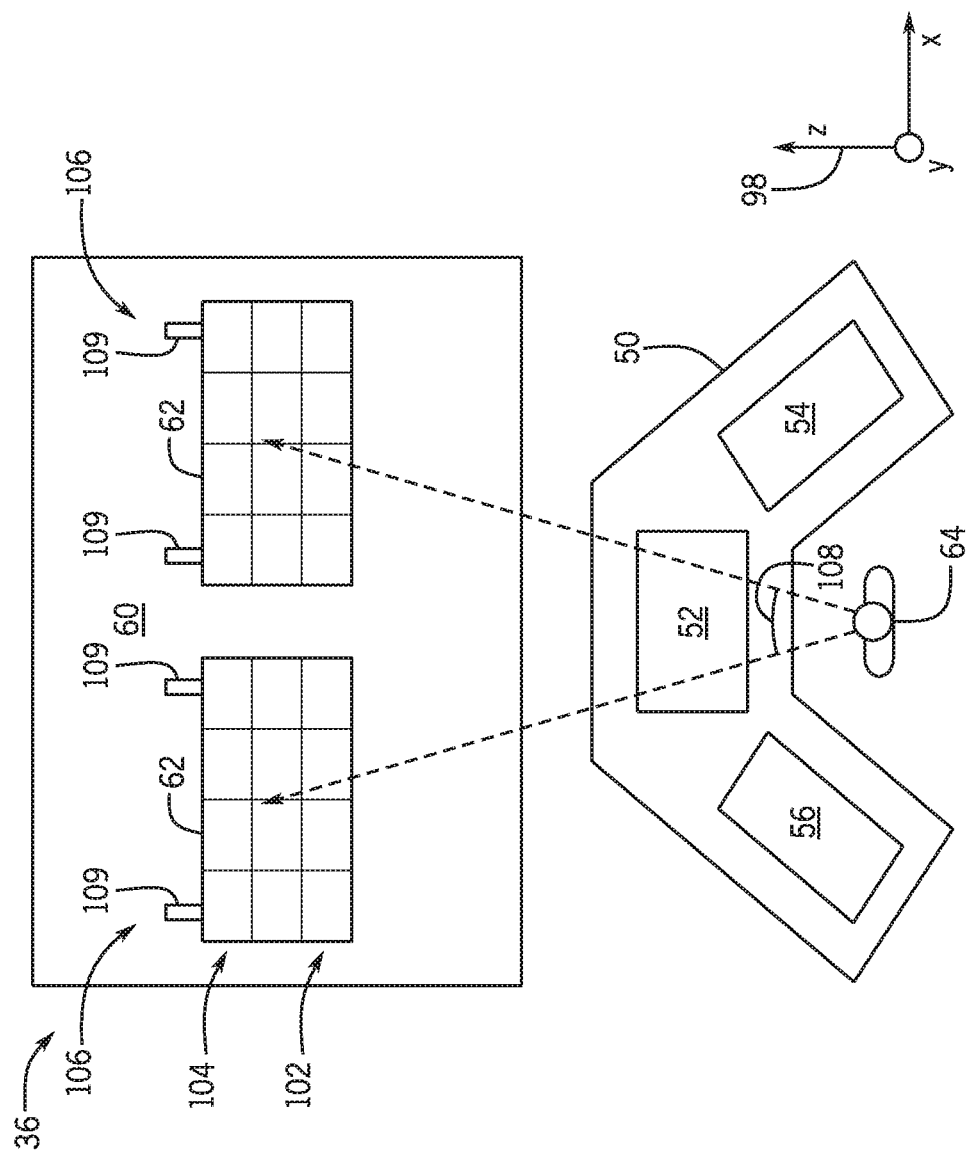
FIG. 4 is a schematic representation of a display wall of the display system of FIG. 2, in accordance with an embodiment of the present disclosure.

FIG. 4 is a schematic representation of an embodiment a display wall 60 of the display system 36 of FIG. 2, in accordance with an embodiment of the present disclosure. In the illustrated embodiment, the display wall 60 may include displays of camera feeds from surveillance cameras positioned along the course 13. In particular, the camera feeds may be displayed in a display array 62, and may be positioned as a wall of video data beyond the tri-panel interface 50 (and/or the ride overview panel 52 and/or the solo screen 540). In certain embodiments, the array 62 may include a single display (e.g., screen), a pixelboard wall, a collection of individual screens with individual camera feeds, or a plurality of screens each subdivided into several views from separate camera feeds.

In certain embodiments, the display panels 62 on the display wall 60 may be positioned a certain distance (e.g., in a z-direction 98) from an estimated operator's eye position. In particular, the display array 62 may optimize the number of total views and the overall size in height and width, such that the lowest row 102 of views is not obstructed by any aspects of the tri-panel interface 50 or the like, the uppermost row 104 of views is as low as necessary to maintain generally neutral head and neck positions. In certain embodiments, these may be optimally attained at or below the eye-ear plane of an average operator, and outer columns 106 may be within 60 degrees of visual angle 108 from midline to edge. The size of each individual display 62 may ensure that the smallest detail for which operator notice is desirable or planned is large enough for the majority of operators 64 to detect, at the viewing distance provided. In some embodiments, the display panels 62 may be capable of actuation. For example, the display panels 62 may be coupled to tracks that enable position (e.g., horizontal and/or vertical) adjustment. Further, in some embodiments the display panels 62 may be actuated in a manner than extends the display panels 62 from the wall toward the seating area for the operator 64 (along the z-direction 98), thus bringing the panels 62 closer to the operator 64. Specifically, for example, the display panels 62 may be moved up (or otherwise) along rails 109 to accommodate desirable viewing angles for a particular operator. Furthermore, upon logging in, the display panels 62 may be automatically adjusted via motorized features coupled to the rails 109 (or other actuation mechanisms, such as extension devices) based on settings for the logged in operator 64. Further, the operator 65 logging in may be required to review and dismiss team member advisory memos before proceeding. Present embodiments may maintain a digital bulletin board of active team member advisory memos in an archive.

Figure 5:
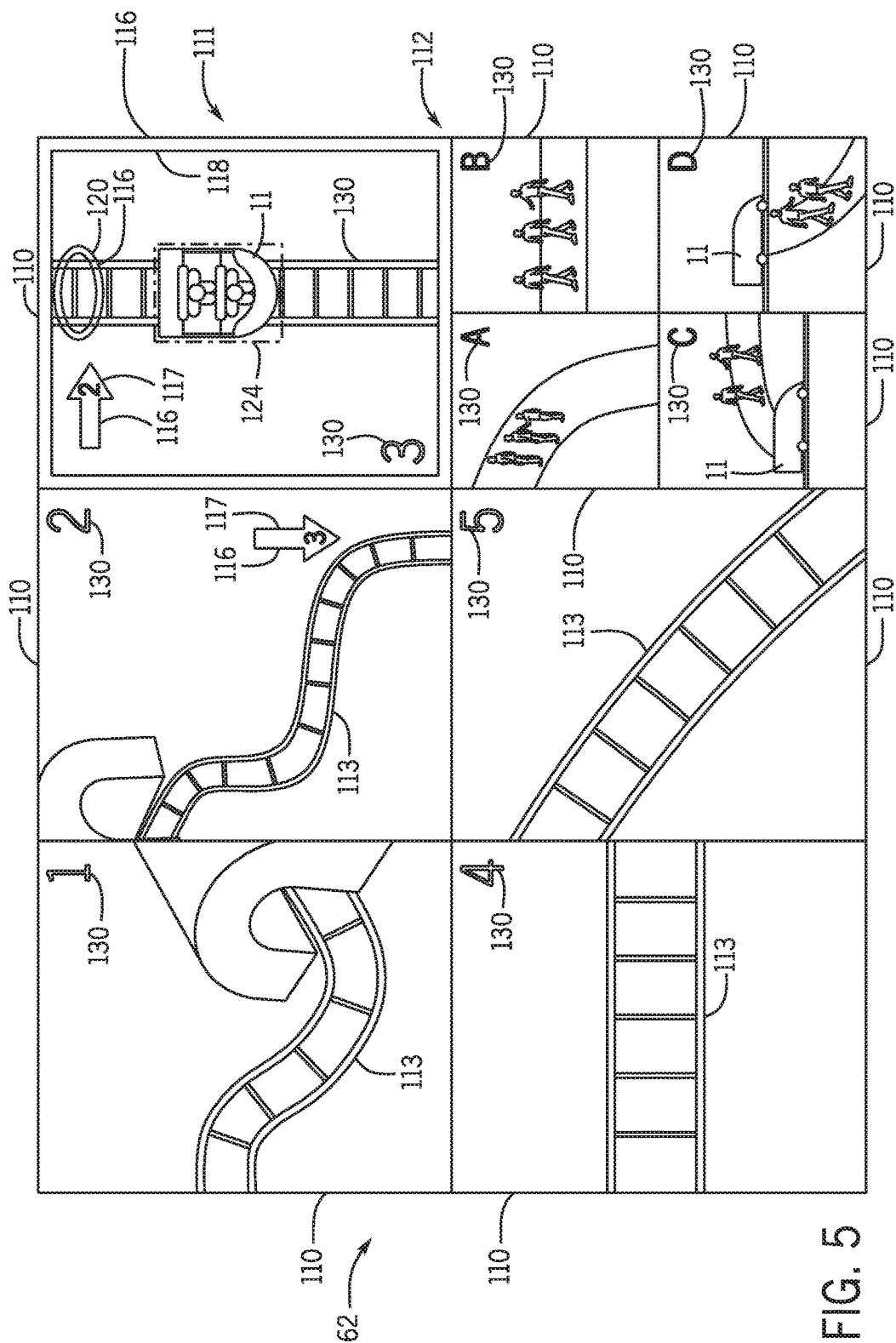
FIG. 5 is a schematic representation of a matrix of views provided on a display panel, in accordance with an embodiment of the present disclosure.

FIG. 5 illustrates an example display panel 62 in accordance with present embodiments. The display panel 62 may include multiple displays (e.g., liquid crystal displays) with corresponding feeds, a single subdivided display or multiple subdivided displays, for example. Traditionally, a protocol for scanning from image to image is used by operators 64 when monitoring the various assortment of video feeds provided in a control room 34. However, it is now recognized that operator decision-making can be facilitated by avoiding discrete video views that may limit pattern recognition. For example, with limited context, an operator may find a screen image questionable but not identify a specific pattern that suggests maintenance may be desirable to avoid downtime for the attraction. Present embodiments facilitate operator assessments of desired control action by facilitating projection of future states, pattern recognition and strong situational awareness by allowing the operator to quickly locate appropriate follow-up information. Specifically, for example, present embodiments achieve this by arranging views 110 (e.g., displayed images from camera feeds) in a logical sequence (e.g., according to progressive vehicle occupancy in camera zones and consequential image capture of ride vehicles 11 as they progress through the course 13) from left to right and then top to bottom as a matrix 111 of the views 110. This may be done regardless of the number of display screens utilized for the display panel 62. Further, certain views may be segregated from others as an aspect of the logical sequence. For example, a subset 112 of the displays may correspond to pedestrian zones (e.g., queuing areas for entering or exiting guests) that are not considered part of the ride flow. This alleviates or eliminates a certain level of cognitive load filtering of visual cues (e.g., pedestrian motion) on the part of the operator 64. That is, by separating different types of views, the operator 64 may be better equipped to identify activity of interest and meriting further assessment.

In one embodiment, the control system 38 may facilitate situational awareness and improved operator assessments by providing dynamic and/or fixed visual cues that emphasize patterns and progressions associated with attraction operations. Specifically, for example, present embodiments may provide graphic indications 116 of where a ride vehicle will enter and subsequently leave the frame to draw the operator's attention to the active area. The graphic indications 116 may include highlighted boxes, arrows, pointers, background color changes, and so forth. In some embodiments, the graphic indications 116 are hidden until a transition of the ride vehicle 11 to the relevant scene is within a threshold time or imminent based on detection by a sensor. For example, when a ride vehicle is detected in a camera zone by a sensor that suggests it will move to a subsequent camera zone within a timeframe or imminently based on the ride progression, the location on a display of a subsequent camera feed where the ride will arrive may be activated to guide the operator's attention to the appropriate location on the display panel 62. This may include a strategically placed pointer 117, highlighting the entire view of the camera zone, as illustrated by graphic 118, or by highlighting a specific location within the camera zone, as illustrated by graphic 120. Combinations of such features and additional features may be used as well. Further, multiple entry or exit points (entry indicators and exit indicators) for a ride vehicle 11 may be highlighted in a single view or display and these indicators or highlights may be rendered as translucent.

Further, the control system 38 may operate to superimpose graphical labels on each view 110 by indicating a consecutive camera indicator 130 (letter or number). To simplify the information, this may only be the camera indicator 130 (not a scene number or architectural index) for the location (camera zone) being displayed as an image. The camera indicator 130 is larger than necessary to be legible but positioned so as not to obscure the image and may even be rendered to appear translucent. While camera indicator "3" is positioned differently in the embodiment in FIG. 5, in other embodiments, the camera indicators 130 are consistently positioned for each view 110 (as in the case for all other views 110 in FIG. 5) to limit information search time on the part of the operators 64 and facilitate rapid selection of views of interest. These camera indicators 130 may facilitate referencing of certain views 110 and locations within views 110. For example, when a view is displaying a ride vehicle positioned within corresponding camera zone, markers indicating the entry point may include a reference to the immediately preceding camera zone and display (at least when an immediately adjacent view is no the preceding camera zone). Further, an indication of an exit point in a display may provide a reference to the camera number for the display upon which the ride vehicle will next be shown. Thus, a ride vehicle passing through a first camera zone may be displayed on a first tile or panel of the display panels 62 and a highlighted entry or exit point may provide an indication of the previous or next display that showed or will show the ride vehicle in a previous or subsequent camera zone. This facilitates monitoring of various zones and the progression of specific vehicles and occupants by the operators 64. Further, distinctive indications (e.g., frame color, fluctuating brightness) may be provided on the display panels 62 to illustrate which panels 62 have information that is also being accessed by, for example, the solo panel 54 or otherwise requires attention (e.g., based on sensor data).

In some embodiments, ghosting of images of the ride vehicles 13 may be provided to illustrate the predicted path or the previous path of the ride vehicle. This ghosting, as illustrated by image 124, may be based on historical image data and may be used by an operator to discern deviation from typical operation (e.g., excessive sway in a track component). As a specific example, historical ghosting data obtained empirically may suggest that the ride vehicle 11 should be located within a specifically defined envelope of positions as it passes through a camera zone. However, movement outside of this envelope may suggest anomalous operation (e.g., excessive sway). In some embodiments, specialized cameras and/or software of the control system 38 (which may include cameras and other sensors) may graphically indicate the visual data showing movement outside of the envelope.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A ride control system, comprising:
   a plurality of ride vehicles positioned within a course and configured to travel within the course;
   a plurality of sensors configured to obtain data relating to operation of the plurality of ride vehicles as they travel within the course, wherein the plurality of sensors include cameras configured to capture images;
   a control system configured to control operation of the plurality of ride vehicles based on the obtained data;
   a workstation including at least one interface panel configured to provide, based on the obtained data, an animated representation of positioning and movement of the plurality of ride vehicles on the course as the plurality of ride vehicles travel within the course, wherein the at least one interface panel faces an operator position for the workstation; and
   one or more panel displays positioned beyond the workstation, wherein the one or more panel displays face the operator position for the workstation, wherein the one or more panel displays are configured to present multiple views in a matrix, wherein a portion of the multiple views corresponds to camera feeds from the obtained data, wherein the control system is configured to provide a graphic indicator within a view of the portion of the multiple views based on the obtained data, and wherein the graphic indicator indicates that an image of the plurality of ride vehicles is expected within the view based on the obtained data, wherein the one or more panel displays include actuators that automatically adjust a location of the one or more panel displays based on an operator login.

2. The ride control system of claim 1, wherein the multiple views in the matrix are arranged left to right and top to bottom based on a progression of the course.

3. The ride control system of claim 1, wherein the portion of the multiple views corresponding to the camera feeds includes graphic labels of associated cameras, and wherein each graphic label comprises a symbol, shape, color, or combination thereof indicative of the associated camera.

4. The ride control system of claim 1, wherein the control system is configured to provide a first additional graphic indicator and a second additional graphic indicator within the view of the portion of the multiple views, wherein the first additional graphic indicator is indicative of an entry location of the plurality of ride vehicles into the view, and wherein the second additional graphic indicator is indicative of an exit location of the plurality of ride vehicles out of the view.

5. The ride control system of claim 4, wherein the graphic indicator, the first additional graphic indicator, the second additional graphic indicator, or any combination thereof is rendered as translucent.

6. The ride control system of claim 4, wherein the second additional graphic indicator includes a reference to a subsequent view of the portion of the multiple views within the matrix.

7. The ride control system of claim 4, wherein the first additional graphic indicator includes a reference to a previous one of the other multiple views within the matrix.

8. The ride control system of claim 1, wherein a lowest row of the matrix is clearly visible above the at least one interface panel from the operator position.

9. The ride control system of claim 1, wherein a portion of the plurality of sensors is resident on the plurality of ride vehicles, and wherein each of the plurality of ride vehicles comprises a vehicle controller configured to interface with the control system.

10. The ride control system of claim 1, wherein the workstation and the one or more panel displays are disposed within a control room remote from the course.

11. The ride control system of claim 1, comprising a solo panel configured to display digitally superimposed images on the animated representation.

12. The ride control system of claim 11, wherein the digitally superimposed images comprise information associated with at least one ride vehicle of the plurality of ride vehicles, information associated with a particular sensor, a scene name, an architectural reference along the course, a show event name or status, or a combination thereof.

13. The ride control system of claim 11, wherein the control system is configured to store data from the plurality of sensors, the stored data including previous images from the cameras, and to display a ghosted image based on the stored data of the plurality of sensors to facilitate detection of anomalous motion.

14. A system, comprising:
a central controller communicatively coupled to a plurality of ride vehicles, wherein the plurality of ride vehicles is positioned within a course and is configured to travel within the course, and wherein each ride vehicle of the plurality of ride vehicles comprises a vehicle controller configured to control movement of the ride vehicle;
a workstation positioned in a control room;
an interface of the workstation facing an operator position of the workstation and comprising one or more interface panels configured to display an animation of the plurality of ride vehicles at expected locations along the course as the plurality of ride vehicles travels along the course, wherein the expected locations are determined based on sensor feedback; and
one or more panel displays configured to display a matrix of views providing camera feeds from cameras disposed in camera zones positioned along the course, wherein the views of the matrix are ordered left to right and up to down according to a corresponding sequence of movement of the plurality of ride vehicles traveling along the course, wherein the one or more panel displays are positioned beyond the workstation and face the operator position for the workstation;
a plurality of speakers positioned along the course and a microphone of the workstation configured to activate one or more speakers of the plurality of speakers, wherein a solo screen of the one or more interface panels is configured to display a portion of the camera feeds, wherein activation of the one or more speakers of the plurality of speakers by the microphone when the solo screen is displaying imagery from the portion of the camera feeds comprises activation of a specific speaker of the plurality of speakers associated with a specific camera feed of the portion of the camera feeds.

15. The system of claim 14, wherein the control room comprises an array wall that includes the one or more panel displays located in an unobstructed line-of-sight from the operator position for the workstation.

16. A ride control system, comprising:
a plurality of ride vehicles positioned within a course and configured to travel within the course;
a plurality of sensors configured to obtain data relating to operation of the plurality of ride vehicles as they travel within the course, wherein the plurality of sensors include cameras configured to capture images;
a control system configured to control operation of the plurality of ride vehicles based on the obtained data;
a workstation including at least one interface panel configured to provide, based on the obtained data, an animated representation of positioning and movement of the plurality of ride vehicles on the course as the plurality of ride vehicles travel within the course, wherein the at least one interface panel faces an operator position for the workstation; and
one or more panel displays positioned beyond the workstation, wherein the one or more panel displays face the operator position for the workstation, wherein the one or more panel displays are configured to present multiple views in a matrix, wherein a portion of the multiple views corresponds to camera feeds from the obtained data, wherein the control system is configured to provide a graphic indicator within a view of the portion of the multiple views based on the obtained data, and wherein the graphic indicator indicates that an image of the plurality of ride vehicles is expected within the view based on the obtained data, wherein the at least one interface panel of the workstation includes an overview panel positioned between a solo screen and a menu panel, wherein each of the overview panel, the solo screen, and the menu panel is pitched backward such that its corresponding bottom edge is adjacent a worksurface of the workstation, its corresponding upper edge is positioned away from the operator position, and its rear edge is positioned at an acute angle relative to the horizontal.

* * * * *